United States Patent Office.

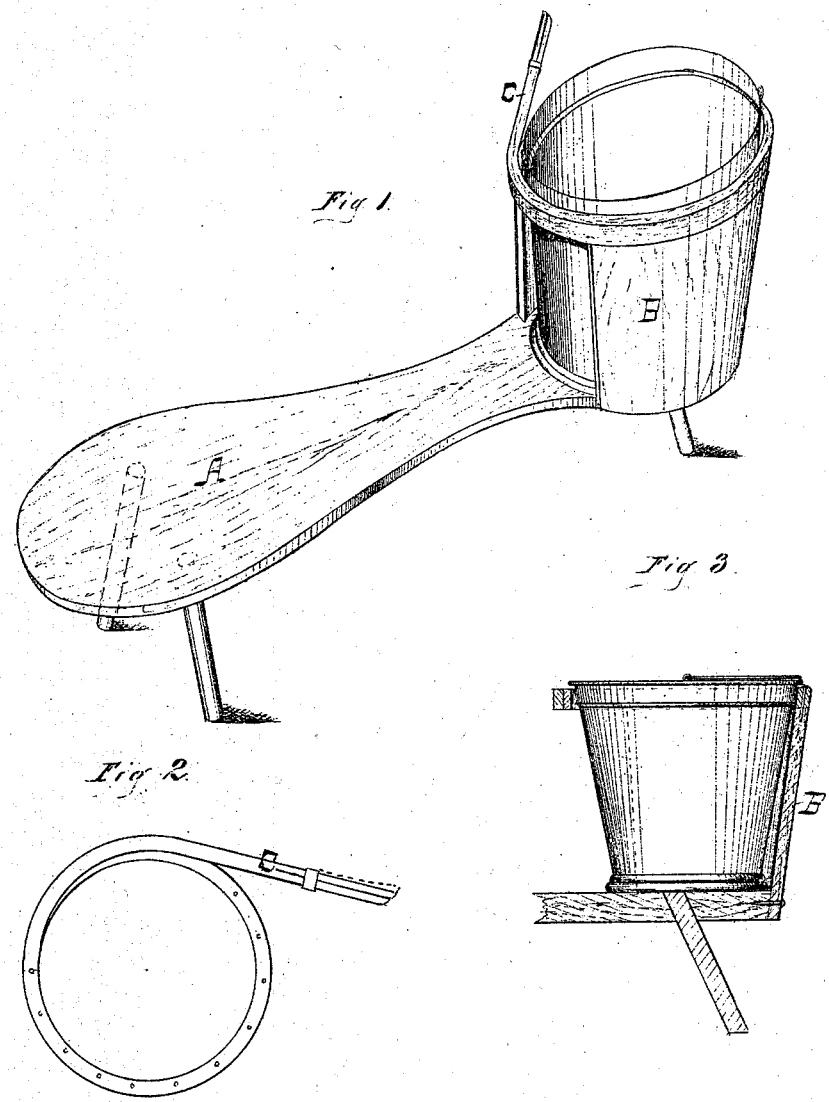

GEORGE W. HAVILAND, OF FORT DODGE, IOWA.

Letters Patent No. 104,452, dated June 21, 1870.

IMPROVEMENT IN MILKING-STOOLS.

The Schedule referred to in these Letters Patent and making part of the same.

*To all whom it may concern:*

Be it known that I, GEORGE W. HAVILAND, of Fort Dodge, in the county of Webster and State of Iowa, have invented a new and useful Improvement in Milking-Stools; and I do hereby declare that the following is a full and exact description of the same, reference being had to the accompanying drawing and to the letters of reference marked thereon.

This invention consists in the employment of a holder and guard in connection with a milking-stool, for the purpose of preventing a kicking animal from overturning the pail and spilling its contents.

The detail of construction will be fully described hereinafter.

In the drawing—

Figure 1 represents a perspective view of my invention;

Figure 2 is a plan view of the guard; and

Figure 3, a partial sectional view.

To enable others skilled in the art to make and use my invention, I will now proceed to describe fully its construction and operation.

A represents a milking-stool, which may be constructed in any proper manner and of any suitable material and size.

B represents a holder, which is securely attached to the front end of the stool A, as shown. It may be made in any suitable manner, but should correspond in size with the milk-pail.

C represents a guard, which is securely attached to the top of the holder B, and extends forward and outward therefrom, tangentially, as shown.

If desired, this guard may be split at its end for the purpose of permitting the tail of the cow to be secured there, and thus save the milker from unnecessary annoyance.

The operation is as follows:

The stool is used in the ordinary manner.

The pail is placed in the holder B and securely held therein.

The guard C effectually prevents the animal from overturning the pail by kicking, as its leg is necessarily guided away from the holder. It also serves to cure fractious cows of the habit of kicking itself, as in practice it has been found that a few futile attempts to accomplish the purpose are sufficient usually to break the animal of the practice altogether.

The stool, as a whole, is exceedingly simple, and can be cheaply made.

Having thus fully described my invention,

What I claim as new, and desire to secure by Letters Patent, is—

The stool described, consisting of the part A, holder B, and guard C, when combined as described, for the purpose set forth.

This specification signed and witnessed this 6th day of April, 1870.

G. W. HAVILAND.

Witnesses:
FREDK. FROST,
L. T. MESERVEY.